United States Patent
Nye et al.

(10) Patent No.: US 12,095,316 B2
(45) Date of Patent: Sep. 17, 2024

(54) SYSTEMS AND METHODS FOR THREADED FASTENERS WITH GROUNDING BRUSH ENDPOINTS

(71) Applicant: Illinois Tool Works Inc., Glenview, IL (US)

(72) Inventors: Richard Francis Nye, Poland, ME (US); Mathew Roman, Winthrop, ME (US)

(73) Assignee: Illinois Tool Works Inc., Glenview, IL (US)

( * ) Notice: Subject to any disclaimer, the term of this patent is extended or adjusted under 35 U.S.C. 154(b) by 30 days.

(21) Appl. No.: 17/505,391

(22) Filed: Oct. 19, 2021

(65) Prior Publication Data
US 2022/0131448 A1  Apr. 28, 2022

Related U.S. Application Data

(60) Provisional application No. 63/105,723, filed on Oct. 26, 2020.

(51) Int. Cl.
H02K 11/40 (2016.01)

(52) U.S. Cl.
CPC ................ H02K 11/40 (2016.01)

(58) Field of Classification Search
CPC .... H02K 11/40; Y02E 10/72; H01R 2201/10; H01R 39/385; H01R 39/24; H01R 39/20
See application file for complete search history.

(56) References Cited

U.S. PATENT DOCUMENTS

| 4,358,699 | A | * | 11/1982 | Wilsdorf | H01R 39/24 428/611 |
| 4,378,610 | A | * | 4/1983 | Ermer | G11B 23/50 |
| 2004/0233592 | A1 | * | 11/2004 | Oh | H02K 11/40 361/23 |
| 2007/0159763 | A1 | * | 7/2007 | Barnard | H02K 11/40 361/212 |
| 2010/0252420 | A1 | * | 10/2010 | Barnard | C25D 7/04 204/194 |
| 2019/0081538 | A1 | * | 3/2019 | Nye | H02K 11/026 |

FOREIGN PATENT DOCUMENTS

| CN | 108886296 | 11/2018 |
| DE | 102007032991 | 1/2009 |

OTHER PUBLICATIONS

Taiwanese Search Report Appln No. 110139604 dated Jul. 6, 2022.
Int'l Search Report and Written Opinion Appln No. PCT/US2021/055747 mailed Feb. 7, 2022.

* cited by examiner

*Primary Examiner* — Tulsidas C Patel
*Assistant Examiner* — Joshua Kiel M Rodriguez
(74) *Attorney, Agent, or Firm* — McAndrews, Held & Malloy, Ltd.

(57) ABSTRACT

Systems and methods to mitigate electrical voltage on a rotating plate are disclosed. An example grounding pen brush includes two or more bundles of conductive filaments that are separated from the others by a threshold distance.

20 Claims, 3 Drawing Sheets

SYSTEMS AND METHODS FOR THREADED FASTENERS WITH GROUNDING BRUSH ENDPOINTS

CROSS-REFERENCE TO RELATED APPLICATIONS

This application hereby claims priority to and the benefit of U.S. Provisional Application Ser. No. 63/105,723, entitled "Systems And Methods For Threaded Fasteners With Grounding Brush Endpoints," filed Oct. 26, 2020. U.S. Provisional Application Ser. No. 63/105,723 is hereby incorporated by reference in its entireties for all purposes.

BACKGROUND

In applications employing a rotating member, such as while a motor or generator are running, a buildup of charge on the equipment can lead to electrical discharges through bearings resulting in mechanical damage and premature bearing failure. A number of mitigation technologies have been used in attempts to overcome this problem, including conductive brushes making contact with the rotating member having a path to ground. However, extreme translational forces between conductive brushes and surfaces of the rotating member may damage conventional systems and methods of mitigating electric voltage and may not provide sufficient protection.

SUMMARY

Systems and methods employing a grounding pen brush to mitigate electric current on a rotating plates are disclosed. In particular, the grounding pen brush includes two or more bundles of conductive filaments that are separated from the others by a threshold distance, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
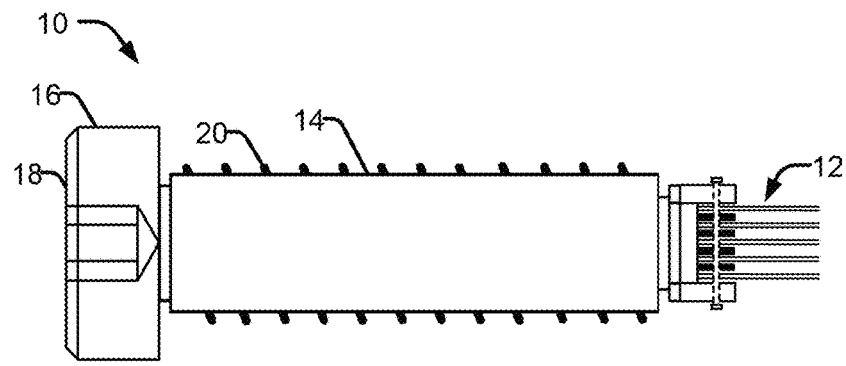
FIG. 1 is an example grounding pen brush, in accordance with aspects of the present disclosure.

Systems and methods that employ a grounding pen brush to mitigate electric current on a rotating plate are disclosed. In particular, the grounding pen brush includes a grounding brush assembly including two or more bundles of conductive filaments (or fibers) configured to extend from the opening when the pen brush is secured to a rotating plate. For instance, each of the two or more bundles of conductive filaments are separated from the others (e.g., at the base of the grounding brush assembly and/or as the filaments extend from the grounding brush assembly) by a threshold distance. The separation may be maintained by employing one or more retainers configured to separate a first bundle from a second bundle of conductive filaments.

In some examples, the grounding pen brush is defined by a body that includes a plurality of external threads used to securing the grounding pen brush in a threaded opening of a rotating plate, the conductive filaments making electrical contact with a conductive element during rotational movement of the rotating plate. Although described in examples as a rotating plate, the plate may be any object, surface, and/or device that provides a current pathway for built-up charges from the conductive element.

In some examples, each bundle may have an equal number of conductive fibers, while in some examples each bundle may have a variable number of conductive fibers. The conductive fibers of each bundle may have a common length, diameter, and/or composition, or a variety of lengths, diameters, and/or compositions.

In an example application, the grounding pen brush or brushes are mounted to the rotating plate or plates, with the bundles of conducted filaments extending from a surface of the rotating plate. The rotating plate is arranged to face another plate (or object, surface, device, etc.) fixed relative to the rotating plate, such that the rotating plate is configured to translate relative to the fixed plate.

Aligned with the bundles of conductive filaments (e.g., along the path of rotation, linear translation, etc.) are one or more conductive elements (e.g., a metal, a conductive alloy, a semiconductor, etc.) mounted to the fixed plate (e.g., via one or more brackets). In such an arrangement, the bundles of conductive filaments are configured to contact the conductive elements, thereby providing a current pathway from the fixed plate to a reference voltage (e.g., an electrical ground) via the grounding pen brush and/or the rotating plate. In some examples, the ground pen brushes are mounted to the fixed plate or object, and the rotating or moving plate translates relative to the fixed plate.

Capacitively and inductively coupled voltage build-up is experienced in a variety of applications, including electric motors and associated mechanically coupled equipment such as transmissions, etc. Some grounding is implemented with relatively few and/or small conductive filaments. Grounding is possible due to low impedance, in some cases with the application of microfiber conductive elements even allowing for mitigation of electrical current without continuous contact and/or without making contact with the moving surface.

In an example of a rotating or translating surface, voltage on the rotating surface causes parasitic or otherwise unwanted current to flow through bearings, and then to ground. Over a short period of time, electrical charges can build to a high level. As the electrical charges pass the discharge threshold of the least electrically resistive path, sometimes through ball bearings between moving parts, an instantaneous burst or discharge of electrical energy can pass along the path. The discharge can cause electric discharge machining (EDM) along the path, which can damage the surfaces of the bearing races and the balls in the bearing if the least resistive path is through the bearings. The electrical energy burst creates fusion craters, and particulate from the crater formation typically remains trapped in the lubricant inside a bearing. Both the fusion crater and the particulate material in the bearing act to disturb the free rotation of the bearing, which can lead to mechanical damage and premature bearing failure. While some disclosed examples are described with reference to rotating plates, the conductive filaments may also be used to make electrical contact with any application that experiences parasitic voltage buildup within a rotating or translating surface.

A number of mitigation technologies have been used in attempts to overcome this problem. Conventional techniques include using a plurality of conductive filaments is a single binding or applicator. Another conventional technique is to ground the rotating surface using spring-loaded solid brushes (e.g., copper, silver graphite, etc.) that provide a continuous flow of current to ground. However, spring loaded brushes can wear out rapidly, requiring frequent, periodic service and replacement. Spring-loaded brushes also tend to vibrate due to alternating frictional relationships between the brush and the rotating surface. Vibration of the brushes, from whatever cause, can result in undesirable sparking and/or increased current flow through bearings and/or downstream equipment. However, these shortcomings are overcome through the disclosed grounding pen brush, in accordance with the following description and figures.

In disclosed examples, a grounding pen brush to mitigate electric current on a rotating plate includes a body including a plurality of external threads for securing the pen brush in a threaded opening of the rotation plate; and a grounding brush assembly including two or more bundles of conductive filaments configured to extend from the opening when the pen brush is secured to the rotation plate, the conductive filaments making electrical contact with a conductive element during rotational movement of the rotating plate.

In some examples, each of the two or more bundles of conductive filaments are separated at the base of the grounding brush assembly by a threshold distance.

In examples, the two or more bundles of conductive filaments comprises a first bundle and a second bundle of conductive filaments, the grounding brush assembly further comprising one or more retainers configured to separate the first bundle and the second bundle of conductive filaments. In examples, the one or more retainers or the two or more bundles of conductive filaments are secured to the grounding brush assembly by a fastener.

In some examples, the one or more retainers or the two or more bundles of conductive filaments are secured to the grounding brush assembly by an adhesive. In some examples, the one or more retainers comprises a dielectric material. In examples, the one or more retainers comprises a conductive material.

In examples, the conductive filaments of the first bundle are a first length, and the conductive filaments of the second bundle are a second length greater than the first length. In some examples, the first bundle comprises a first number of conductive filaments, and the second bundle comprises a second number of conductive filaments greater than the first number.

In some examples, one or more conductive filaments comprises a composite fiber. In examples, one or more conductive filaments comprises at least one of carbon fiber, nickel, stainless steel, a woven fiber, or a conductive plastic.

In some examples, the rotating plate is arranged in a motor.

In some examples, the rotating plate is arranged in a wind turbine.

In disclosed examples, grounding pen brush to mitigate electric current on a moving plate includes a body including a plurality of external threads for securing the pen brush in a threaded opening of the moving plate; and a grounding brush assembly including two or more bundles of conductive filaments configured to extend from the opening when the pen brush is secured to the moving plate, the conductive filaments making electrical contact with a conductive element during movement of the moving plate.

In some examples, each of the two or more bundles of conductive filaments are separated at the base of the grounding brush assembly by a threshold distance.

In examples, one or more of the moving plate or the conductive element is a gear.

In some examples, the conductive element comprises a plate in a position fixed relative to movement of the moving plate. In some examples, the conductive element is arranged on a plate in a position fixed relative to movement of the moving plate.

In examples, the moving plate comprises one or more threaded openings to receive the grounding pen brush. In some examples, a head portion configured to drive the grounding pen brush into or out from the one or more threaded openings of the moving plate.

Referring now more specifically to the drawings, FIG. 1 provides a cut-away view of a grounding pen brush 10 that includes a grounding brush assembly 12 with two or more bundles of conductive filaments (or fibers). In some examples, each filament is a fine, hair-like filament made from carbon fibers, nickel, stainless steel, conductive plastics, or any other conductive fiber-type filament, including hybrid and composites thereof such as nickel coated carbon fibers, or copper coated steel fibers.

The grounding pen brush 10 is defined by a body 14 that includes a plurality of external threads 20 used to securing the pen brush 10 in a threaded opening. A head portion 16 may contain a tool face 18 for turning the grounding pen brush 10 into and out from the opening. One or more components of the grounding pen brush 10, including but not limited to the body 14, threads 20, head portion 16, and/or a portion of the grounding assembly 12, may be formed as a unitary piece. In some examples, components of the grounding pen brush 10 are formed separately and joined. One or more components grounding pen brush 10 may be formed of a conductive material (e.g., metals, metallic alloys, carbon composites, etc.) sufficient to carry current.

FIG. 2A-2D illustrate a mix of different arrangements of conductive filament bundles. In some examples, each bundle may have an equal number of conductive filaments, while in some examples each bundle may have a variable number of conductive filaments. The conductive filaments of each bundle may have a common length, diameter, and/or composition, or a variety of lengths, diameters, and/or compositions. Similar or identical reference numbers in FIGS. 1-5 are used to refer to similar or identical components, denoted with an "A" or a "B" to distinguish between alternative components.

Figure 2A:
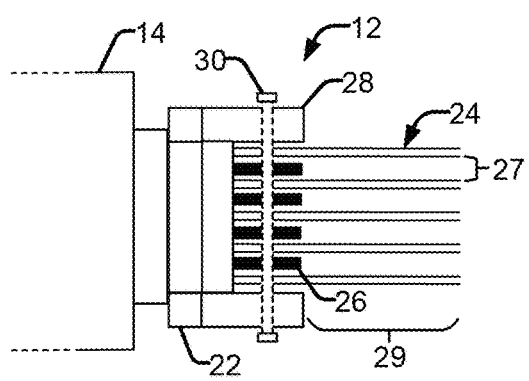
FIG. 2A-2D illustrate example filament arrangements in a grounding brush assembly of the grounding pen brush of FIG. 1, in accordance with aspects of the present disclosure.

In the example brush assembly 12 of FIG. 2A, each of the bundles of conductive filaments or fibers 24 are separated from the other by one or more retainers or buffers 26. As shown, the retainers 26 are arranged within a base 22 of the grounding brush assembly 12, such that the bundles of conductive filaments 24 extend from the grounding brush assembly 12 with a threshold distance 27 between each bundle. As shown in the example of FIG. 2A, one or more of the bundles of conductive filaments 24 are parallel to another bundle. One or more of the retainers 26 and/or bundles 24 are secured within the base 26 by use of a fastener 30 through one or more sidewalls 28 extending from the base. Additionally or alternatively, a length 29 that the fibers stick out beyond the walls 28 may be optimized to limit wear, contact pressure, etc., during rotational movement.

In some examples, the conductive filaments are integrally formed with the grounding brush assembly 12, such as by additive manufacturing.

Although shown with the separation being maintained by employing retainers 26 within the base 22, the bundles may be inserted into a hole in the base 22, and/or through a hole in a plate or other element (e.g., atop the sidewalls 28) to maintain the desired threshold separation.

Figure 2B:
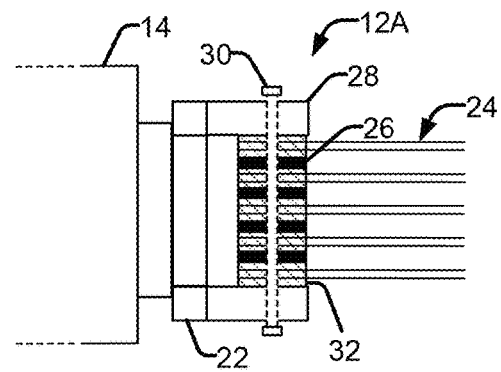

FIG. 2B provides another example brush assembly 12A, with an additional or alternative adhesive or bonding agent 32 (e.g., a conductive plastic, conductive adhesive, nonconductive noncontinuous adhesive, etc.) added within the space between the sidewalls 28 to strengthen and/or secure the retainers 26 and/or bundles 24 within the brush assembly 12A.

Figure 2C:
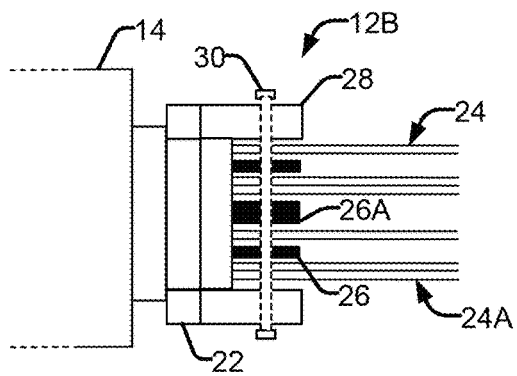

FIG. 2C provides yet another example brush assembly 12B, with an additional or alternative retainer 26A is provided to vary the spacing between bundles. Additionally or alternatively, a bundle of conductive filaments 24A may include a variable number of fibers, either a greater or lesser number of fibers than bundle 24 within the brush assembly 12B.

Figure 2D:
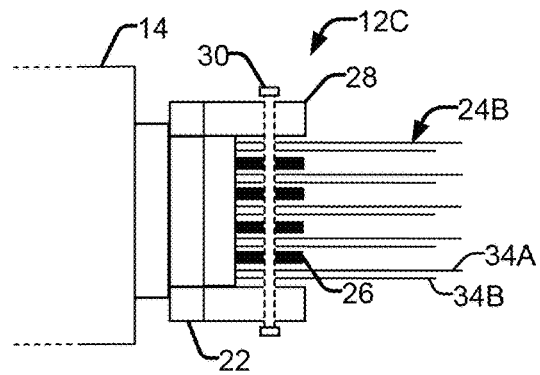

FIG. 2D provides still another example brush assembly 12C, with an additional or alternative bundle of conductive filaments 24B, which includes fibers 34A of a first length as well as fibers 34B of a second length.

Additionally or alternatively, one or more of the conductive filaments may have a lesser or greater material stiffness (e.g., more rigid material) than other filament fibers. For example, the fibers may have a thicker diameter, be made of a stiffer material, and/or be prepared by a particular processing treatment (e.g., a composite of a plurality of smaller fibers bound together with a polymer matrix material, such as but not limited to nylon, polyester, vinylester, or epoxy, in a process such as but not limited to extrusion or pultrusion, etc.). Furthermore, some of the conductive filaments may have a generally round shape, other geometries are contemplated, including substantially flat, rectangular, triangular, and oval, as a non-limiting list of examples. In some examples, the conductive filaments are coated in an epoxy or otherwise treated to improve stiffness and/or durability as the plate to which the grounding pen brush 10 rotates relative to a fixed plate (as provided in FIGS. 3A, 3B and 4).

Figure 3A:
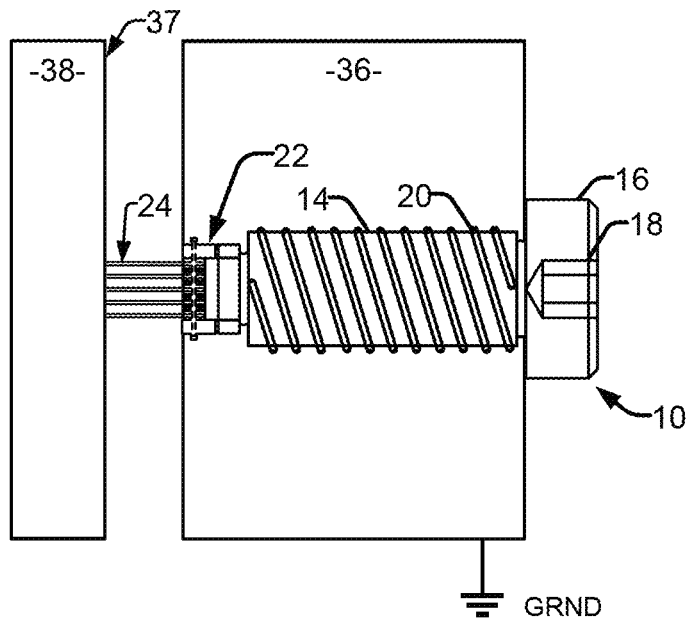
FIGS. 3A and 3B are example arrangements of the grounding pen brush of FIG. 1, in accordance with aspects of the present disclosure.
Figure 3B:
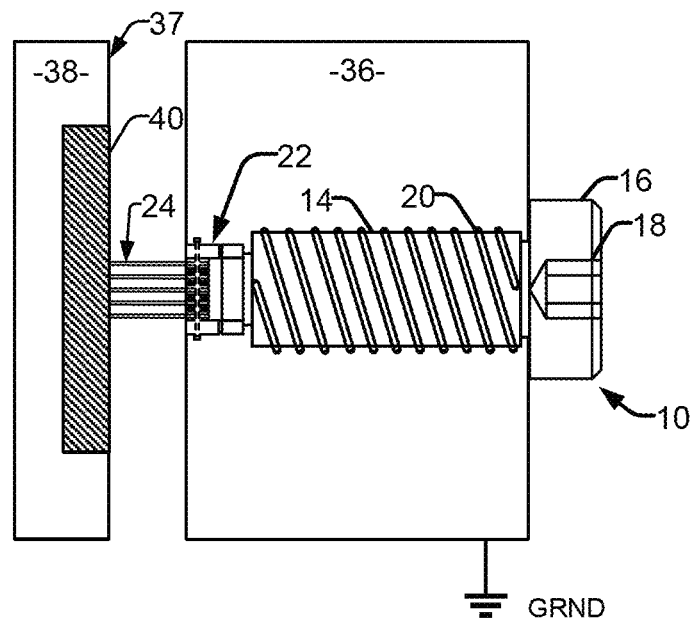

In an example application illustrated in FIGS. 3A and 3B, the grounding pen brush 10 is configured to be installed on a rotating or moving plate or object 36 relative to a fixed plate or object 38. The example grounding brush assembly 10 dissipates electrical charges that may build up on the plate 38. The grounding brush assembly 10 can be provided in a variety of different sizes for use on plates 36 of different thicknesses or geometries. The grounding brush assembly 10 can be used on a variety of applications having rotating surfaces, including motors, turbines, conveyors and other assemblies and constructions that may build up an electrical charge.

The grounding pen brush 10 is arranged for the one or more bundles of conductive filaments to dissipate, directly or indirectly through the ground, static charges, common mode voltage, and/or other charges that build on the fixed plate 38 and through a conductive element 40 during operation (e.g., of a motor, a turbine, a gear, etc.). In some examples, the addition of the conductive element 40 is optional, such that the conductive filaments 24 may contact the surface 37 directly. In some examples, the body 14 is secured in the plate 36 via the threads 20, as well as one or more alternative or additional fasteners, such as snap fit, riveting, a bolt, adhesive, soldering, welding, or other suitable fastening techniques.

As shown in FIGS. 3A and 3B, the example grounding brush pens 10 may be arranged individually in a substantially continuous plate or annular ring 36, arranged circumferentially around a central axis about which the plate 36 rotates. In some examples, each conductive filament is oriented toward a surface 37 of the fixed plate or object 38. Although illustrated as being arranged substantially perpendicularly to the surface 37, in some examples, the grounding pen brush 10 may be installed at an angle relative to the surface.

The thin, lightweight conductive filaments physically contact the surface 37 of the plate 38 directly, as shown in FIG. 3A. In some examples, the conductive filaments contact the plate via the conductive element 40. In both examples, direct transfer of electrical charge from the plate 38 is performed without significant wear during operation. Transfer of charge between the plate 38 to the conductive filaments of the bundles 24 occurs through direct contact of the conductive filaments of the bundles 24 against the plate 38 (e.g., via the conductive element 40). The electrical charge can transfer between the conductive filaments 24 and the plate 36 and the ground connection. Thus, charge that builds on the plate 38 is dissipated to ground through grounding brush assembly 10 before arcing can occur. As used herein, the term "grounding" refers to any circuit path which allows the grounding device to affect a reduction in the voltage difference between the plate 38 and one or more of bearings and/or downstream equipment such as gears, bearings, or the like.

Further, as a result of maintaining a threshold separation distance between bundles, and an appropriate bundle size for the fiber type and geometry, the interaction of fibers with different adjacent fibers or fiber bundles is less likely to cause any individual or bundle of fibers to be excessively stiffened and act with more than ideal contact pressure, and/or to be lifted away from the contacting surface, and/or deform beyond a threshold level. The supporting interaction, partial composite action or full composite action between the fibers is exploited to tune an increase in stiffness to aide in maintaining contact with the conductive element 40. In some examples, one or more of the plurality of filaments (e.g., within each bundle and/or between bundles) may be bonded, such that a greater degree of composite action is achieved between fibers (up to and including full composite action), which may further stiffen the bonded fiber(s).

In some examples, the conductive filaments of the bundles 24 are able to deform in a desirable manner, such as within a threshold amount of deformation, based on an angle of bending, a strain or force experienced by the fibers or a portion thereof, may be optimized based on a variety of factors, including properties of the fibers (e.g., diameter, length, material type, material strength, treatment process, etc.) and/or properties of the environment (e.g., temperature, distance between the grounding assembly 12 and a surface 37, impedance, etc.). This tuning serves to optimize contact pressure such that the fibers experience minimal wear while providing adequate shaft voltage mitigation. The conductive filaments of the bundles 24 are configured to bend or flex to follow the surface 37 as the plate 36 rotates, regardless of rotation direction. Thus, operation and benefits of the disclosed assemblies are applicable for plates with rotation in a single direction or reversing directions.

In some examples, properties of the fibers are optimized based on material stiffness, diameter of fiber and exposed length of fiber, as well as the resulting overlap of the fibers with the surface 37 at a suitable contact pressure. Optimization for a particular application may also include adjusting one or more of a diameter of individual fibers and/or a diameter of bundles thereof, employing smaller and/or greater diameters as necessary (for one or both) to optimize performance from contact pressure, environment, and wear.

In some such examples, one or more of the conductive filaments may have diameters less than about 150 microns. The conductive filaments may have diameters within a range of about 5 microns to about 100 microns. Alternatively, the conductive filaments can be larger fibers of conductive material that are held in contact with the conductive element 40.

Additionally or alternatively, the fibers may be a mix of fibers or bundles of fibers having two or more orientations, and may be continuous or non-continuous, depending on a particular application or desired outcome. In some examples, a continuous fiber forms a loop such that both ends of the fiber are secured to body, with the middle of the fiber flexed into contact with the surface. A continuous fiber may provide longer wear life over a non-continuous fiber, which is secured to the body at one end and contacts the surface at the opposite end.

It should be understood that the number of fibers may in some embodiments be much greater than shown, and the proximity much closer, with the drawing showing a greater spacing and smaller number of fibers for visual clarity.

Figure 4:
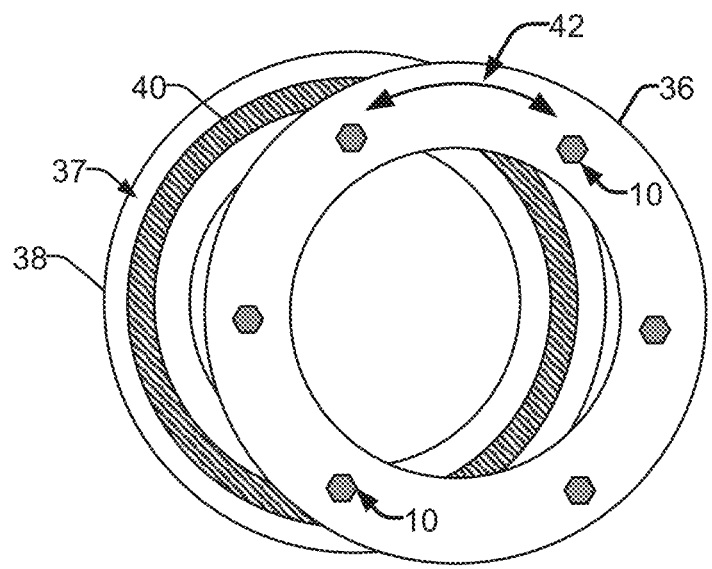
FIG. 4 is an example implementation of the arrangement of the grounding pen brush of FIG. 3B, in accordance with aspects of the present disclosure.

As illustrated in the example of FIG. 4, the plate 36 is defined by an annular body with the plurality of grounding pen brushes 10 disposed within and circumferentially around the annular body. As shown, a single row of grounding pen brushes 10 is arranged at a given radial distance from a central axis. However, multiple rows at multiple radial distances may be employed, with any number of grounding pens brushes 10 at each distance. The example annular plate 36 is made of conductive materials, such as metals including, but not limited to aluminum, stainless steel, bronze and/or copper, and/or conductive plastics.

As the plate 36 rotates in a direction 42 relative to the plate 38 (or vice versa), the conductive filament bundles 24 overlap with the surface of the conductive element (e.g., bend or flex to contact the surface of the conductive element during rotation) in a manner different than conventional fibers. The conductive filaments may overlap with the surface 37, such that the forces and thus bending experienced by each fiber is less than a conventionally arranged fiber (e.g., without a separation distance). Thus, the individual and bundled conductive filament may experience less wear by being tuned to the correct contact pressure.

Figure 5A:
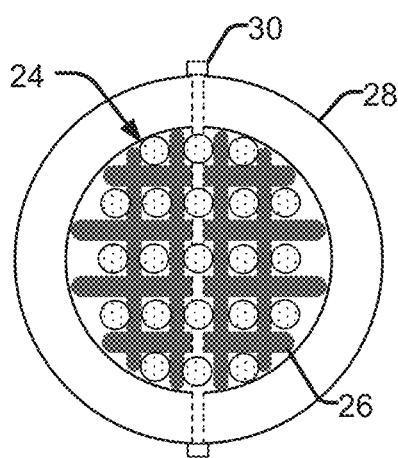
FIGS. 5A and 5B illustrate example filament and retainer arrangements in a grounding brush assembly of the grounding pen brush of FIG. 1, in accordance with aspects of the present disclosure.
Figure 5B:
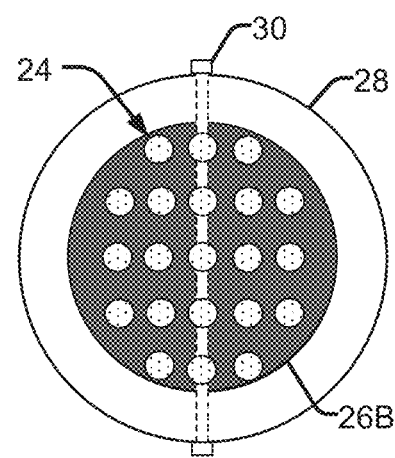

FIGS. 5A and 5B illustrate example arrangements of filament bundles 24 and retainer(s) 26. As shown in FIG. 5A, retainers 26 are arranged to separate individual bundles 24. Although illustrated in a grid pattern, the retainers 26 may be configured as individual retainers around each bundle of fibers 24, and/or may surround a subset of bundles. FIG. 5B shows a single retainer 26B, which may have openings or holes through which individual bundles 24 may extend.

Although illustrated with a single fastener 30 to secure the bundles 24 or retainers 26, multiple fasteners may be employed (e.g., for two or more, or for each column and/or row of bundles and/or retainers). Further, although shown as generally circular, the sidewall(s) 28 may be any suitable geometry, including circular, rectangular, triangular, or any suitable polygon, and may have one or more open section through the sidewall exposing a greater portion of the fibers.

Thus, as disclosed in the present application, a grounding pen brush with a plurality of conductive filaments extending therefrom, the conductive filaments arranged to contact a conductive element as the grounding pen brush translates relative to the surface, or vice versa. In some examples, the grounding pen brush is secured to a plate or hub configured to translate (e.g., rotationally, linearly, etc.) relative to a fixed plate or surface, to which the conductive element is mounted. For instance, the plate may be a generally planar structure, such as a disk, ring, plate, or other suitable structure. The plate has one or more holes extending from a given surface to another surface of the plate to accept a pen brush, such that the conductive filaments extend from the plate when secured thereto.

The conductive filaments may extend from the plate to contact a surface of the fixed plate upon which a conductive element is mounted, such that the conductive filaments contact the conductive element when the plate and the fixed plate are joined. In some examples, the hub is configured to rotate about a central axis, whereas the conductive element is configured as a strip mounted to the fixed plate. As the plate (and therefore the grounding pen brushes) rotate, the conductive filaments make contact with the conductive element, providing a path to ground for electrical discharge.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present disclosure. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A grounding pen brush to mitigate electric current on a rotating plate, the pen brush comprising:
   a body including a plurality of external threads for securing the pen brush in a threaded opening of the rotating plate; and
   a grounding brush assembly including three or more bundles of conductive filaments, each conductive filament bundle being substantially parallel and separated from each other conductive filament by a threshold distance and configured to extend from the opening when the pen brush is secured to the rotating plate, the conductive filaments making electrical contact with a conductive element during rotational movement of the rotating plate.

2. The grounding pen brush as defined in claim 1, further comprising a base to secure the three or more bundles of conductive filaments, wherein each of the three or more bundles of conductive filaments are separated at the base of the grounding brush assembly by the threshold distance.

3. The grounding pen brush as defined in claim 1, wherein the three or more bundles of conductive filaments comprises a first bundle, a second bundle and a third bundle of conductive filaments, the grounding brush assembly further comprising one or more retainers configured to separate the first bundle from the second bundle and the third bundle of conductive filaments.

4. The grounding pen brush as defined in claim 3, wherein the one or more retainers or the three or more bundles of conductive filaments are secured to the grounding brush assembly by a fastener oriented at a non-zero angle relative to the orientation of the three or more bundles of conductive filaments.

5. The grounding pen brush as defined in claim 3, wherein the one or more retainers or the three or more bundles of conductive filaments are secured to the grounding brush assembly by an adhesive.

6. The grounding pen brush as defined in claim 3, wherein the one or more retainers comprises a dielectric material.

7. The grounding pen brush as defined in claim 3, wherein the one or more retainers comprises a conductive material.

8. The grounding pen brush as defined in claim 3, wherein the conductive filaments of the first bundle are a first length, and the conductive filaments of the second bundle are a second length greater than the first length.

9. The grounding pen brush as defined in claim 3, wherein the first bundle comprises a first number of conductive filaments, and the second bundle comprises a second number of conductive filaments greater than the first number.

10. The grounding pen brush as defined in claim 1, wherein one or more conductive filaments comprises at least one of a composite fiber, carbon fiber, nickel, stainless steel, a woven fiber, or a conductive plastic.

11. The grounding pen brush as defined in claim 1, wherein the rotating plate is arranged in a motor.

12. The grounding pen brush as defined in claim 1, wherein the rotating plate is arranged in a wind turbine.

13. A grounding pen brush to mitigate electric current on a moving plate, the pen brush comprising:
   a body including a plurality of external threads for securing the pen brush in a threaded opening of the moving plate; and
   a grounding brush assembly including three or more substantially parallel bundles of conductive filaments each separated by at least a minimum threshold distance and configured to extend from the opening when the pen brush is secured to the moving plate, the conductive filaments making electrical contact with a conductive element during movement of the moving plate.

14. The grounding pen brush as defined in claim 13, further comprising a base to secure the three or more bundles of conductive filaments, wherein each of the three or more bundles of conductive filaments are separated at a base of the grounding brush assembly by a threshold distance.

15. The grounding pen brush as defined in claim 13, wherein one or more of the moving plate or the conductive element is a gear.

16. The grounding pen brush as defined in claim 13, wherein the conductive element comprises a plate in a position fixed relative to movement of the moving plate.

17. The grounding pen brush as defined in claim 13, wherein the conductive element is arranged on a plate in a position fixed relative to movement of the moving plate.

18. The grounding pen brush as defined in claim 13, wherein the moving plate comprises one or more threaded openings to receive the grounding pen brush.

19. The grounding pen brush as defined in claim 18, further comprising a head portion configured to drive the grounding pen brush into or out from the one or more threaded openings of the moving plate.

20. A grounding pen brush to mitigate electric current on a rotating plate, the pen brush comprising:
   a body including a plurality of external threads for securing the pen brush in a threaded opening of the rotating plate; and
   a grounding brush assembly including:
      three or more bundles of conductive filaments, each conductive filament being separated from each other conductive filament by a threshold distance and configured to extend from the opening when the pen brush is secured to the rotating plate, the conductive filaments making electrical contact with a conductive element during rotational movement of the rotating plate; and
      one or more retainers comprising a dielectric material, the one or more retainers configured to separate the three or more bundles of conductive filaments.

\* \* \* \* \*